Dec. 20, 1960 H. C. DOOLING 2,964,845
HEDGE TRIMMING DEVICE
Filed Feb. 2, 1959
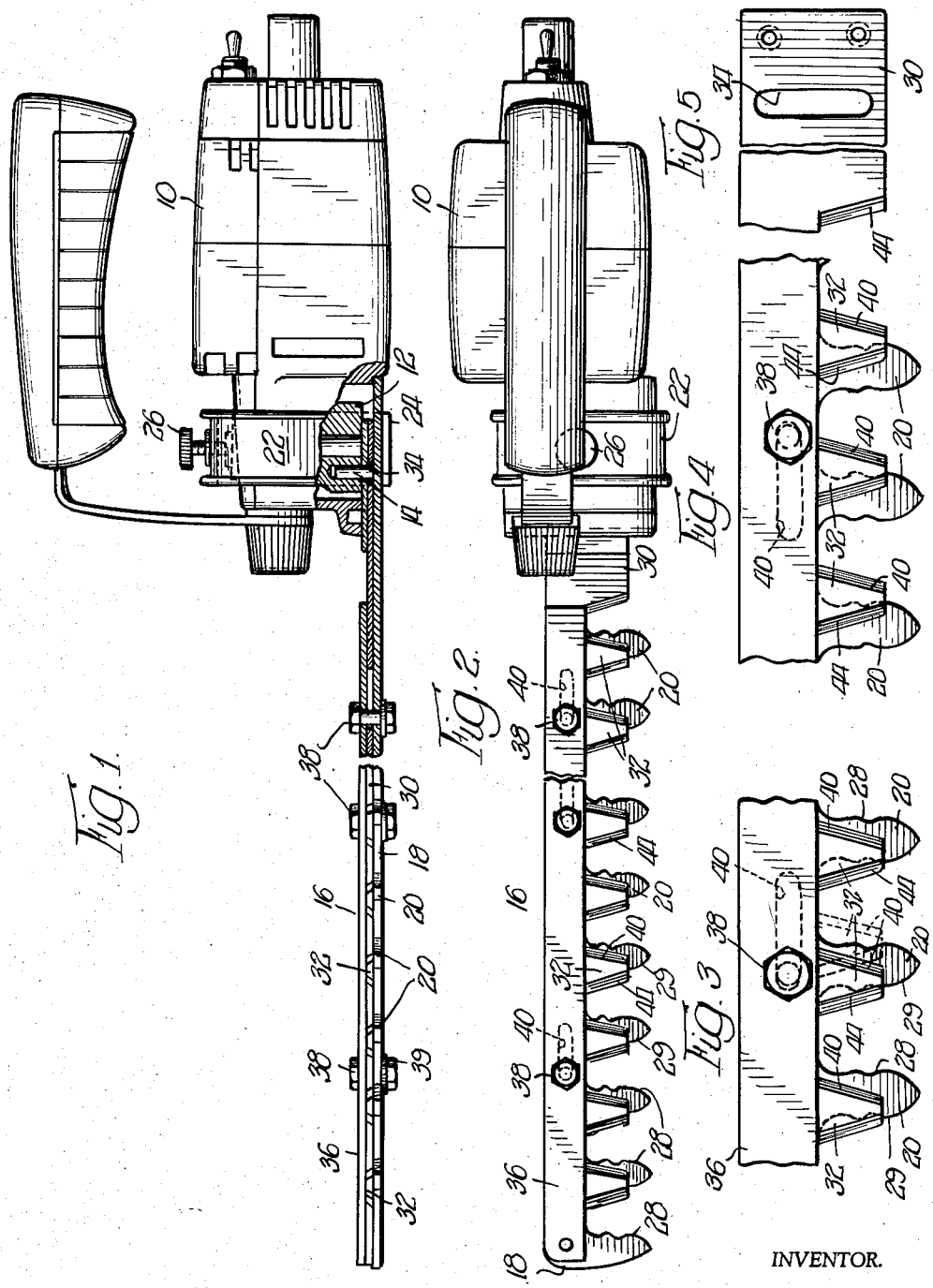
INVENTOR.
Henri C. Dooling.

United States Patent Office 2,964,845
Patented Dec. 20, 1960

2,964,845
HEDGE TRIMMING DEVICE

Henri C. Dooling, Evanston, Ill., assignor to Skil Corporation, Chicago, Ill., a corporation of Delaware Filed Feb. 2, 1959, Ser. No. 790,474

1 Claim. (Cl. 30—216)

The present invention relates to a hedge trimming device and more particularly to a hedge trimming device of the portable power driven reciprocating type useful for trimming hedges, shrubs and ornamental trees.

Prior designs of hedge trimmers of this type had the usual stationary blade with equally spaced teeth therealong and a reciprocating blade having corresponding equally spaced teeth therealong cooperating with the stationary blade teeth to cut the material desired. In the reciprocation, the teeth of one blade become superimposed over the teeth of the other blade tending to wipe lubricant on the tooth surfaces off of the teeth on either side thus increasing friction between these moving parts and placing an overload on the motor and gear mechanisms. This complete overlay of one set of teeth by the other on each stroke means a longer stroke for the reciprocating mechanism requiring a heavier motor than needed with consequent more expense or results in an underpowered trimmer. The teeth of the blades have also been subject to bending and breakage as they have been made thin enough to permit easy access of branches and yet to limit the size of branches to be cut between adjacent teeth.

One object of the invention is to provide a trimmer of the above character having less friction between reciprocating parts.

Another object of the invention is to provide a trimmer that will remain well lubricated for longer periods of time during working operations.

Another object of the invention is to provide a trimmer that has more cutting power for a given size of motor.

Yet another object of the invention is to provide a trimmer which is simple and sturdy in construction, relatively inexpensive to manufacture, and will require relatively less maintenance.

Other objects and advantages will be apparent from the following description taken in connection with the accompanying drawings in which:

Fig. 1 is a view in side elevation with parts broken away of a trimmer embodying the present invention;

Fig. 2 is a view in top plan of the trimmer of Fig. 1;

Fig. 3 is a view of an enlarged fragment of the cutter bar assembly of the invention with the reciprocating bar and its teeth shown in its furthest position to the right;

Fig. 4 is a view similar to Fig. 3 with the reciprocating bar and its teeth shown in its furthest position to the left; and Fig. 5 is an enlarged view of a fragmentary portion of the reciprocating cutter bar member showing its attaching means.

Tests of prior trimmers indicated that friction between the reciprocating and stationary bars was causing undue strain on trimmers and that frequent lubrication was necessary to prevent this. Stopping the trimmer for this purpose caused loss of time and aggravation and, if neglected, costly repairs ensued. To overcome this, the present invention includes the conception that the teeth of one bar while superimposable, should be limited from complete coverage of the corresponding teeth of the other bar so that the teeth are not wiped substantially clean of lubricant on alternate strokes. This, however, possibly reduces the cutting throat or entry for shrub and hedge limbs which heretofore had normally been fixed by opposed cutting edges of adjacent teeth on the stationary cutter bar or comb. This is overcome by substantially spacing the stationary cutter bar teeth apart a distance farther than the thickness of the largest material adapted to be cut by the trimmer, spacing the reciprocating bar teeth correspondingly, but mounting the teeth of the bars in an offset manner and limiting the throw or stroke of the reciprocating bar so that its teeth are positively limited from covering the teeth of the comb or stationary bar more than a predetermined amount. Lubricant on the teeth is spread back and forth on the teeth surfaces and not wiped therefrom at the end of each stroke, and the opposed cutting edges of a reciprocating blade tooth and of a spaced adjacent comb tooth forms the throat or entry for branches thus fixing the limit of the maximum thickness of material to be cut by the trimmer. As the teeth of both bars are now spread farther apart and the distance between adjacent teeth on each bar no longer form a limit for branches to be cut, they can be strengthened and thickened to prevent prevalent breakage.

Referring to the drawings, it will be noted that the trimmer includes a housing 10 in which a suitable motor may be mounted and operatively connected to any suitable well known drive mechanism for converting the rotary motion of the motor to reciprocating motion, for instance through any well known suitably mounted gear means 12 having a pin 14 eccentrically mounted therein. As this forms no part of the invention and will be obvious to those skilled in the art, the actual means are not shown.

An elongated cutter assembly, generally indicated at 16, includes a stationary cutter bar or comb member 18 having equally and substantially spaced teeth 20 fastened at one end to housing 10 in any suitably rigid manner adjacent the eccentric means 14. A substantially U-shaped strap member 22 may be fitted over the housing 10 with its free ends 24 bent inwardly and under the comb member to assist in holding the cutter bar assembly to the housing. As shown this strap member may be adjustably tightened through the threaded thumb screw 26 that is mounted in a threaded aperture in the strap member 24 and has a bearing on the housing 10 for this purpose.

Teeth 20 have cutting edges 28 facing in one direction and cutting edges 29 facing in the opposite direction. Preferably opposed cutting edges 28 and 29 in adjacent teeth are spaced substantially farther apart than the thickness of the largest branch or other work piece adapted to be cut by the trimmer. Since these opposed cutting edges do not define the work entry portion or mouth, the teeth 20 may be widened and strengthened to prevent breakage during any normal usage.

To effect the cutting action, a reciprocable cutter bar member 30 having teeth 32 therealong correspondingly spaced as teeth 20 overlies the comb member 18 and is transversely slotted as at 34 (Fig. 5) to receive the eccentrically mounted pin 14 of the reciprocatory mechanism 12 to positively reciprocate cutter bar member 30. To complete the cutter assembly, a clamping bar member 36 overlies the cutter bar member 30 and the assembly, is clamped together by spaced clamping bolts 38 that extend through the clamping bar 36, the reciprocating bar 30 and the comb member 18. Suitable nuts 39 and lock washers may be used to tighten the assembly. Spaced slots 40 are formed axially along the body portion of cutter bar member 30 to permit axial reciprocation of this member with respect to clamping bolts 38 that extend therethrough.

Clamping bar member 36 and comb member 18 are tightened to the reciprocating member 30 sufficiently to hold the assembly together but to permit two or three reciprocations of the bar 30 after the motor has been cut off.

The slots 40 in the reciprocating member 30, the clamping bolts 38 and the throw or orbital path of the eccentric pin 14 are so arranged that the reciprocating bar 30 may be mounted to the cutter bar assembly 16 so that teeth 32 are limited from a complete overlying or overlapping position with teeth 20 of the comb member 18. As may be seen in Figs. 2, 3 and 4, in either maximum position of reciprocation cutting teeth 32 do not become superimposed or overlie teeth 20 completely so that lubricant cannot be wiped completely off the tooth surfaces in either maximum position.

As cutting teeth 32 of the reciprocating bar member 30 have cutting edges 40 facing in one direction and cutting edges 44 facing in the opposite direction, in either position of maximum reciprocation, one cutting edge partially overlaps a tooth 20 while the other cutting edge remains in the gap or space between an adjacent tooth 20 and its cutting edge to form or define a limiting mouth or entry portion for twigs or branches to be cut. For instance in Figs. 2 and 3, cutter bar 30 has been reciprocated to its maximum position to the right. A cutting edge 40 of each tooth 32 overlaps partially a corresponding tooth 20 and has just finished a cutting cycle. Cutting edge 44 of each tooth 32 remains in the gap or space between its adjacent cutting tooth 20 and defines, with a cutting edge 28 of the adjacent stationary tooth 20, a limiting mouth or entry for branches substantially smaller than the distance between opposed cutting edges 28 and 29 of adjacent teeth 20.

As may be seen in Fig. 3, tooth 32 at the extreme right of the reciprocating member 30 is at its maximum position to the right and its cutting edge 40 overlies but is limited from covering its underlying stationary tooth 20. Its movement to its maximum position to the left is indicated by dotted lines to accomplish the foregoing results. Consequently the maximum distance to travel of the reciprocating bar member 30 in either direction, as limited by the throw of pin 14, is less than the distance between centers of adjacent stationary teeth 20 or between centers of adjacent teeth 32. For instance, if the distance between centers of adjacent teeth is 1.0625" the maximum reciprocation may be .75". This means that with equivalent power there is a more efficient cutting action in the present trimmer or that less power may be used to obtain equivalent cutting action with prior trimmers.

Various modifications of the invention will be apparent to those skilled in the art without departing from the spirit and scope of the same as defined in the appended claims.

I claim:

In a portable hedge trimming device of the power driven reciprocating cutter blade type having a stationary comb member with equally spaced teeth therealong, a reciprocable cutter bar member with correspondingly equally spaced teeth therealong mounted in operative cutting relation with said comb member and means for reciprocating said cutter bar member, said stationary teeth on said comb member being spaced so that the clearance space between said stationary teeth is greater than the diameter of the largest work piece adapted to be cut, the cutter bar member being reciprocated so that the teeth of the cutter bar move in alternate directions from a position centered in the clearance space between the stationary teeth, the length of stroke of said reciprocation being less than the tooth spacing whereby a portion of each cutter bar tooth is always within the clearance space between the adjacent stationary comb teeth to limit the size of the work piece.

References Cited in the file of this patent

UNITED STATES PATENTS

| | | |
|---|---|---|
| 1,594,277 | Stanley | July 27, 1926 |
| 2,594,961 | Maylen | Apr. 29, 1952 |
| 2,652,626 | Dutcher | Sept. 22, 1953 |
| 2,664,626 | Jepson | Jan. 5, 1954 |
| 2,882,596 | Lee | Apr. 21, 1959 |